May 30, 1961 J. A. HECK 2,986,414
SHAFT SEAL

Filed Aug. 27, 1959 2 Sheets-Sheet 1

INVENTOR.
JOHN A. HECK.
BY C. Daniel Cornish
his ATTORNEY.

May 30, 1961    J. A. HECK    2,986,414
SHAFT SEAL
Filed Aug. 27, 1959    2 Sheets-Sheet 2
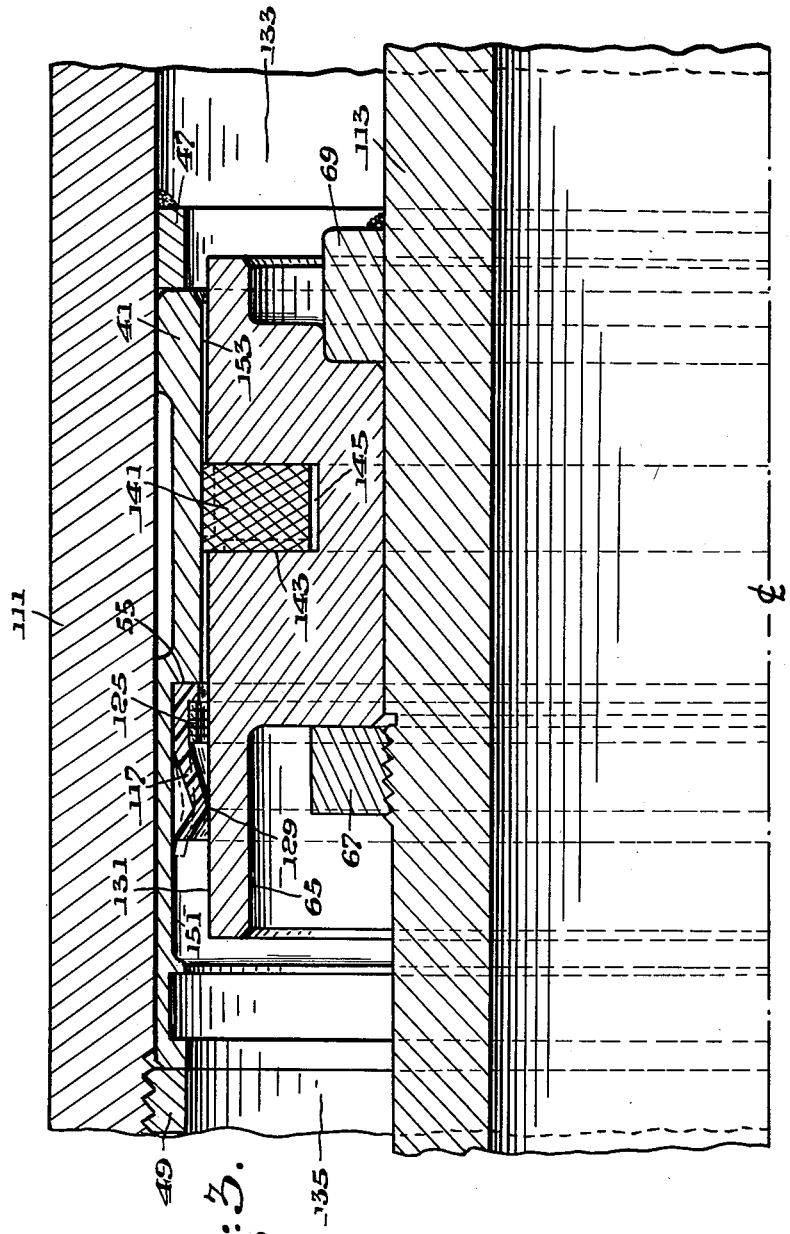
INVENTOR.
JOHN A. HECK.
BY
C. Daniel Cornish
his ATTORNEY

United States Patent Office 2,986,414
Patented May 30, 1961

2,986,414
SHAFT SEAL

John A. Heck, Drexel Hill, Pa., assignor to Koppers Company, Inc., a corporation of Delaware Filed Aug. 27, 1959, Ser. No. 836,533
2 Claims. (Cl. 286—11.11)

This invention relates generally to the sealing of fluids and more particularly to the blocking of the passage of fluid in an annular space between two coaxially rotatable members.

The conventional practice of blocking the passage of fluid between two coaxially rotatable members by the use of a piston ring seal has not been satisfactory with respect to leakage in cases where static oil heads existed on the seal after shut down as for example in applications where the center line of the shaft is vertical. This problem can be corrected by complicated means such as springing the piston ring axially and through use of complicated seal joints in the piston ring. A more simple means of obtaining the desired leakage control during shut down periods is desirable both from a cost and space limitation view point.

An object of this invention, therefore, is to provide a novel seal that will block the flow of fluid in the annular space between inner and outer coaxially rotatable members by contacting both members when the outer member is not rotating and that will move outwardly away from the inner member and longitudinally along the outer member when the outer member is rotating.

Broadly, the invention blocks fluid flow in the space between two rotatable members and comprises a seal that rotates with outer member of inner and outer coaxially rotatable members and has a flexible extension engaging said inner member to block the flow of fluid in said space between these members when the outer member is not rotating but disengaging from said inner member in response to centrifugal force when the outer member is rotating so as to reduce friction between said inner member and said seal.

The above and further objects and novel features of the invention will appear more fully from the following detailed description when the same is read in connection with the accompanying drawing. It is to be expressly understood, however, that the drawings are not intended as a definition of the invention but are for the purpose of illustration only.

Fig. 3 is a partial cross section symetrical about a center line of another embodiment of Fig. 1.

Figure 1:
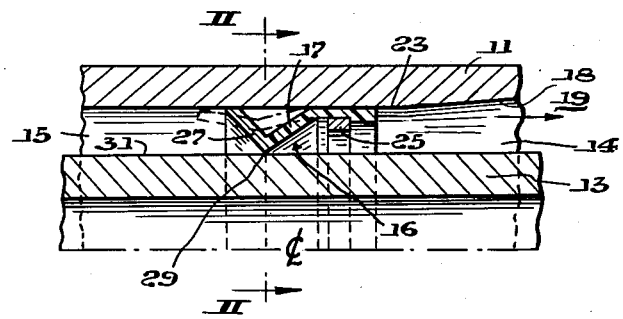
Fig. 1 is a partial cross section symetrical about a center line of one embodiment of this invention.
Figure 2:
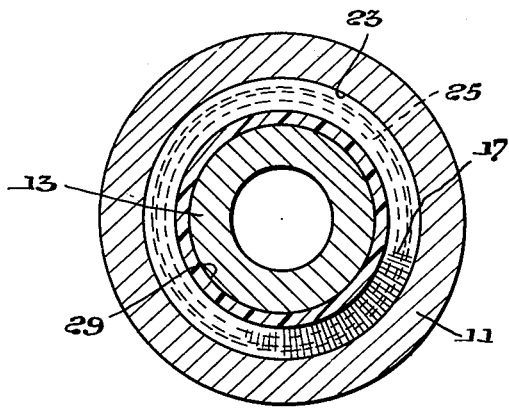
Fig. 2 is a partial end view of Fig. 1.

Referring now to Figs. 1 and 2, an embodiment of the invention is illustrated herein as being applied to a conventional "twin spool" jet engine having an external rotatable turbine shaft 11 around an internal coaxially rotatable turbine shaft 13 supported by suitably lubricated bearings (not shown) in spaces 14 and 15. The lubrication is supplied by pumps (not shown) and the same or other oil may also be used for cooling purposes. The outer shaft 11 of the jet engine may rotate at speeds greater than 17,000 revolutions per minute, and the inner shaft 13 may rotate at speeds greater than 12,000 revolutions per minute. These high angular velocities decrease the tendency of the fluids in space 14 to flow longitudinally between the shafts from space 14 to space 15, for example, centrifugal force tends to move fluid along tapered portion 18 of shaft 11 in the direction of arrow 19. Also, a piston ring seal which may be a conventional split gap or step seal ring with its outside diameter in contact with the inside of shaft 11 and small side clearances in a groove in shaft 13 will block fluid flow from space 14 to space 15 when shafts 11 and 13 are rotating. When the shafts stop the tendency arises for the fluids to accumulate in space 14 and to drain by moving longitudinally between the shafts from space 14 to space 15. This tendency, of course, being particularly great where the shafts are not in a horizontal position. This invention substantially eliminates the tendency for longitudinal movement of the fluid when the shafts are stationary.

An annular seal 16 is held in removeable contact with rotatable surface 23 of outer shaft 11 by a metal expandable noncontinuous ring 25 which is advantageously substantially rectangular in cross section so as to bear against member 17 and hold the seal in contact with shaft 11 for rotation with the shaft, and yet make the seal readily removeable from the shaft. Member 17 has unattached extended portion 27 that is advantageously substantially V shaped in cross section; the vertex portion 29 tending normally to grip the outer surface 31 of inner shaft 13. Member 17 is fabricated of a resilient material so that member 17 will react to centrifugal force. Thus, rotation of shaft 11 will expand the inside diameter of vertex portion 29 radially outwardly away from surface 31 and move it longitudinally along shaft 11. Sufficient rotation of shaft 11 will flatten the vertex portion against surface 23 to the position shown by the dotted lines in Fig. 1. After the rotation of shaft 11 stops, the effects of centrifugal force are removed and member 17 returns to its original shape and dimensions so that the pointed portion 29 grips surface 31 thereby to block fluid flow from space 14 to space 15 or vice versa.

Advantageously, member 17 may be made from a natural or synthetic rubber elastomer (for example the synthetic material sold under the trademark "Viton" A which is produced by E. I. du Pont de Nemours and company which is particularly advantageous for use in jet engines because the elastomer is not damaged by oil or temperatures up to about 500° F.) It is understood, however, that other materials such as plastic, can be used for member 17 as long as they have the required elastic characteristics so that under the influence of centrifugal force an extended annular portion made therefrom will expand and after the centrifugal force is removed will return to its original shape and dimensions.

Normally, when the shafts 11 and 13 rotate at high speeds, there is no fluid leakage from space 14 into the space 15 between shafts 11 and 13. As long as the shafts rotate at high speeds, centrifugal force will flatten member 17 against surface 23 of shaft 11 so there is no friction between surface 31 and portion 29 which can cause wear of member 17, but when shaft 11 slows down or stops, oil accumulates between the shafts and this oil tends to leak from space 14 to space 15. Stopping the shafts removes the centrifugal force acting on member 17 and the self-energizing characteristics of the elastomer used for member 17 causes the latter to come into sealing contact with surface 31 to prevent this oil leakage. Thus, this invention provides a substantially perfect seal with the added advantage that wear of member 17 is practically non-existant. Further, the seal of this invention is simple, inexpensive and easy to assemble and disassemble.

In another embodiment of this invention, Fig. 3, ring 41 is held against shoulder 47 of shaft 111 by a nut 49 threaded in shaft 111. Cylindrical surfaces 151 and 153 of ring 41 are substantially parallel to the axis of shafts 111 and 113 and form a shoulder 55. Ring 125 clamps a member 117 against surface 151 and shoulder 55 of ring 41 so that member 117 and ring 41 rotate with shaft 111. Member 117 has a cross sectional configuration of V-shape, as described above, with relation to member 17 so that vertex portion 129 normally tends to grip outside cylindrical surface 131 of ring 65 which by means of nut 67 threaded on shaft 113 is held against shoulder 69 for rotation with shaft 113.

When shafts 111 and 113 are stationary or when shaft 111 is stationary, portion 129 of member 117 grips surface 131 to block fluid flow between shafts from space 133 to space 135 or vice versa. Rotation of shaft 111 creates a centrifugal force which expands member 117 and moves portion 129 outwardly away from surface 131. When the speed of shaft 111 is great enough this movement completely eliminates rubbing contact between the member and surface 131. Thereafter as the speed of shaft 111 decreases the effects of centrifugal force are reduced until member 117 again grips surface 131. It is understood, of course, from the above that member 117 may rotate with a ring attached to shaft 111 so that member 117 rubs on shaft 113 or member 117 may also rotate with shaft 111 so as to rub on a runner attached to shaft 113. Also, it is understood that piston ring seal 141 running in a known piston ring groove 145 will block fluid leakage from space 133 to space 135 when the shafts 111 and 113 are rotating because ring 141 has small side clearance with ring groove 145 and centrifugal force will cause the ring to seal against surface 153 and rotate with shaft 111. The ring 141 will not prevent leakage when shafts 111 and 113 are not rotating because then there are no seating forces acting on the ring. This embodiment also has the advantage that it will also block air leakage from space 133 to space 135 which may be produced by the rotation of the shafts because the air pressure will seat ring 141 against the side 143 of the ring groove 145 and cause ring 141 to seat against surface 153. Centrifugal force will press the outside diameter of ring 141 against surface 153 and cause the ring to rotate with shaft 111.

The seal of this invention has the advantage of simplicity and economy and provides a near perfect seal between two coaxially rotatable shafts which is subject to substantially no wear when the shafts are rotating even when there is a very high difference in relative speeds between the two shafts.

What is claimed is:

1. A seal for blocking the flow of fluid in the annular space between inner and outer coaxial rotatable shafts comprising, an annular member adapted to be fixed to said outer shaft for rotation therewith, a flexible annular extension formed of a resilient material and under static conditions being substantially V-shaped cross section having the upper end of one leg attached to said member and the vertex and the upper end of said other leg engaging the inner and outer peripheries of said rotatable shafts, respectively, for blocking the flow of fluid in said space, said extension being responsive to centrifugal force upon rotation of said outer shaft to increase the vertex angle thereof so that said vertex is spaced from said inner shaft periphery to permit the free flow of fluid through said annular space.

2. A seal for blocking the flow of fluid in the annular space between inner and outer coaxial rotatable shafts comprising, an annular member adapted to be fixed to said outer shaft for rotation therewith, a flexible annular extension of substantially V-shaped cross section formed of a resilient material of substantially uniform thickness and having the upper end of one leg attached to said member and the vertex and the upper end of said other leg engaging the inner and outer peripheries of said rotatable shafts, respectively, under static conditions for blocking the flow of fluid in said space, said extension being responsive to centrifugal force upon rotation of said outer shaft to increase the vertex angle thereof so that said vertex is spaced from said inner shaft periphery to permit the free flow of fluid through said annular space.

References Cited in the file of this patent

UNITED STATES PATENTS

| 2,076,747 | Salisbury | Apr. 13, 1937 |
| 2,140,356 | Gutmann | Dec. 13, 1938 |
| 2,171,968 | Augustin | Sept. 5, 1939 |
| 2,781,209 | Jacobs | Feb. 12, 1957 |